(12) United States Patent
Havar et al.

(10) Patent No.: US 10,272,989 B2
(45) Date of Patent: Apr. 30, 2019

(54) HIGH-LIFT SYSTEM

(71) Applicant: Airbus Defence and Space GmbH, Ottobrunn (DE)

(72) Inventors: Tamas Havar, Bruckmuehl (DE); Meinhard Meyer, Munich (DE); Heiko Fietzek, Bernau (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 227 days.

(21) Appl. No.: 14/948,765

(22) Filed: Nov. 23, 2015

(65) Prior Publication Data
US 2016/0144947 A1 May 26, 2016

(30) Foreign Application Priority Data
Nov. 26, 2014 (EP) .................................. 14003978

(51) Int. Cl.
| | | |
|---|---|---|
| *B64C 9/14* | (2006.01) | |
| *B64C 9/16* | (2006.01) | |
| *F16C 29/02* | (2006.01) | |
| *F16C 33/26* | (2006.01) | |

(52) U.S. Cl.
CPC .................. *B64C 9/14* (2013.01); *B64C 9/16* (2013.01); *F16C 29/02* (2013.01); *F16C 33/26* (2013.01); *F16C 2326/43* (2013.01)

(58) Field of Classification Search
CPC ................ B64C 9/14; B64C 9/16; B64C 9/18
See application file for complete search history.

(56) References Cited

U.S. PATENT DOCUMENTS

| | | | |
|---|---|---|---|
| 3,515,444 A | | 6/1970 | Grabner |
| 5,494,354 A | * | 2/1996 | Tsukada ............... F16C 29/0642 384/13 |
| 7,011,276 B2 | * | 3/2006 | Stephan .................... B64C 9/16 244/216 |
| 7,857,263 B2 | * | 12/2010 | Gartelmann ............... B64C 9/16 244/213 |
| 8,157,208 B2 | * | 4/2012 | Recksiek ................... B64C 9/16 244/213 |
| 8,757,543 B2 | * | 6/2014 | Wildman ................... B64C 9/16 244/99.3 |
| 9,452,823 B2 | * | 9/2016 | Havar ........................ B64C 9/16 |
| 2015/0292561 A1 | * | 10/2015 | McNeil ...................... B64C 9/16 244/213 |
| 2016/0091547 A1 | * | 3/2016 | Fleischhauer ........... B60L 5/205 324/503 |

FOREIGN PATENT DOCUMENTS

| | | |
|---|---|---|
| CA | 2353280 A1 | 2/2002 |
| EP | 0571357 A2 | 11/1993 |
| EP | 2284077 A2 | 2/2011 |
| WO | 2005077756 A1 | 8/2005 |

OTHER PUBLICATIONS

European Patent Office, European Search Report for European Patent Application No. 14003978.5 dated May 21, 2015.

* cited by examiner

*Primary Examiner* — Richard R. Green
(74) *Attorney, Agent, or Firm* — Lorenz & Kopf LLP

(57) ABSTRACT

A high-lift system for an aircraft includes a high-lift flap which is arranged on the wing of the aircraft and is mounted on a carriage coupled to the wing, the carriage being displaceably mounted on a track by means of a high-lift bearing. The high-lift bearing includes a plain bearing.

16 Claims, 3 Drawing Sheets

HIGH-LIFT SYSTEM

CROSS-REFERENCE TO RELATED APPLICATION

This application claims priority to European Patent Application No. 14003978.5, filed Nov. 26, 2014, which is incorporated herein by reference in its entirety.

TECHNICAL FIELD

The embodiments herein relate to a high-lift system for an aircraft.

BACKGROUND

A high-lift aid is a device on an aerofoil of an aircraft that is used to increase the lift coefficient of the aerofoils in certain situations, as a result of which the aircraft can fly at relatively low speeds. The high-lift aid additionally provides an increase in drag required during the landing and take-off phases.

High-lift systems comprise high-lift flaps that are arranged on the wing of the aircraft that can be moved between a retracted position and a plurality of extended positions by means of an actuator. When the flap is extended, the flap is moved backwards with respect to the wing and thus the active wing profile is lengthened. The profile curvature increases, the angle of incidence of the flap becomes larger and the associated increase in the aerodynamic lift occurs. Air flows from the lower face of the wing to the upper face of the flap at high speed through the gap formed between the flap and wing during the extension movement, further contributing to the lift increase.

One of the most common types of high-lift system is the Fowler flap, in which, while the flap is being extended, it is moved backwards away from the wing, forming the abovementioned gap. In particular as the flap is increasingly extended, this movement is accompanied by an increase in the angle of incidence of the flap.

A mechanism for actuating a Fowler flap typically contains, on the underside of the wing, a rail (track) which extends obliquely downwards from the wing towards the rear and on which a carriage is displaceably mounted. The carriage is coupled to the flap by means of a joint.

The carriage is conventionally mounted on the track by means of rolling bearings or barrel roller bearings. During operation, these often have to be lubricated and require a large amount of installation space. During use, the rollers can become blocked, which can lead to the rollers flattening in some places. The tracks can also become damaged as a result, which in turn necessitates laborious repairs.

In addition, other objects, desirable features and characteristics will become apparent from the subsequent summary and detailed description, and the appended claims, taken in conjunction with the accompanying drawings and this background.

SUMMARY

One embodiment is to provide an improved high-lift system. A high-lift system according to the embodiment has a high-lift flap arranged on the wing of the aircraft. The flap is mounted on a carriage coupled to the wing, the carriage being displaceably mounted on a track by means of a high-lift bearing. The high-lift bearing may comprise a plain bearing.

The high-lift system according to the embodiment, it is advantageous in that the high-lift bearing gives the carriage a low overall height. This is made possible in particular by using slide blocks of low overall height. In addition, the plain bearing is low-wear and can have the same service life as that of the aircraft.

In some embodiments, the plain bearing may comprise at least one slide block that contains, as the engineering material, a material having a low coefficient of friction. In some further embodiments, the at least one slide block may be made of or consist of a material having a low coefficient of friction.

In some embodiments, all the slide blocks of the plain bearing may comprise or consist of a material having a low coefficient of friction.

According to some embodiments, the slide blocks may comprise a support body, which is provided with a sliding layer on a contact surface facing the track. This advantageously reduces material costs since only the sliding layer itself has to consist of a material having a low coefficient of friction.

The material can be applied to the contact surface, for example as a coat, a layer, a coating or a liner.

Teflon, fibre-reinforced Teflon, graphite, lead alloy, tin alloy, and sintered metal having lubricant embedded in the pores are all preferred materials having a low coefficient of friction.

According to some embodiments, the plain bearing is maintenance-free. This allows the high-lift bearing and thus the high-lift system to be operated without the need to lubricate the high-lift bearing. This provides a low level of maintenance for the high-lift bearing and thus for the high-lift system.

If a low-maintenance plain bearing is used according to one embodiment, the bearing provides good emergency running properties.

According to one embodiment, a slide block can comprise an abrasive-wear detection system. This indicates when the slide block has worn down by a predetermined thickness.

According to a further embodiment, the wear detection system comprises a graphite region that can be exposed once the sliding bearing has worn down by a predetermined thickness. During operation, the track is then coloured black by the abrasion of the graphite. This acts as a visual display for the wear of the slide block. Furthermore, the abraded graphite from the graphite region also lubricates the slide block with respect to the track, which further improves the emergency running properties.

If a sliding layer is applied to a support body of the slide block, this is advantageously the layer which, once worn, can be used to expose the graphite region, for example, a graphite pin.

According to one aspect, the slide blocks are trapezoidal, an angle on the side which faces the track being acute, i.e. less than 90°. As a result, any dirt on the track is automatically removed therefrom when the carriage moves on the track. The high-lift system is thus self-cleaning.

According to an embodiment, the slide blocks comprise dirt guards which are arranged and formed such that dirt on the track is wiped off during operation. As a result, gentle yet more effective cleaning of the tracks can be achieved with the slide blocks.

The dirt guard can, for example, contain or consist of a brush or a rubber element.

It may be advantageous for the dirt guard to be trapezoidal, an angle on the side which faces the track being acute. During operation, this has the same effect as described for the slide block itself.

BRIEF DESCRIPTION OF THE DRAWINGS

The various embodiments will hereinafter be described in conjunction with the following drawing figures, wherein like numerals denote like elements.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
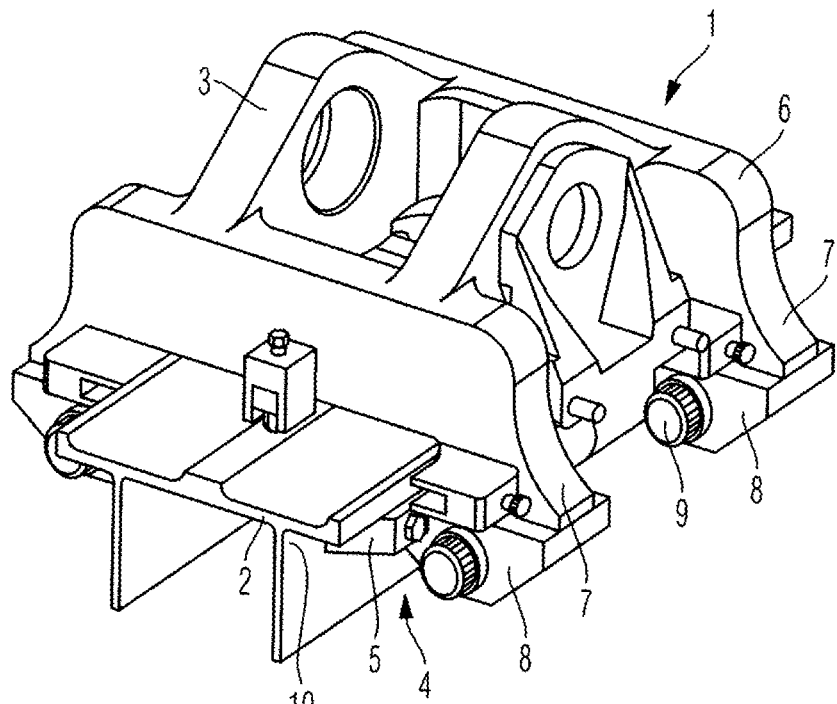
FIG. 1 is a perspective view of a carriage according to an embodiment.
Figure 2:
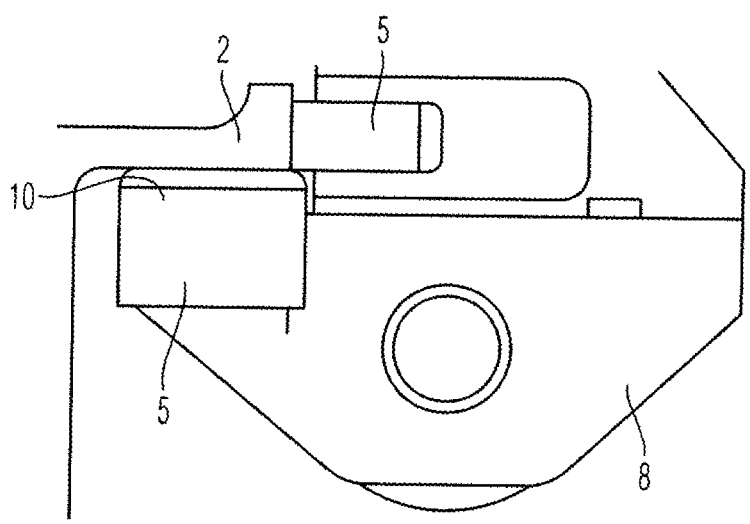
FIG. 2 is a side view of a detail of the carriage from FIG. 1.

A Fowler flap (not shown) is displaceably mounted on a track 2 by means of a carriage 1. The track 2 extends obliquely downwards towards the rear on the underside of a wing of an aircraft. The carriage 1 is coupled in the front region of the flap by means of a joint 3 having a point of rotation. According to track rear link kinematics, when the flap is extended, the flap is moved backwards in relation to the wing and thus the active wing profile is lengthened. As the profile curvature increases, the angle of incidence of the flap becomes larger and the associated increase in the aerodynamic lift occurs. According to some embodiments, the carriage 1 is mounted on the track 2 by means of a plain bearing 4. The plain bearing 4 contains slide blocks 5 made of sintered metal, in the pores of which grease is embedded as a lubricant. As a result, the plain bearing 4 is maintenance-free. During operation, the track 2 is not damaged and thus the high-lift system as a whole can be maintained with less effort than conventional high-lift systems having a rolling bearing or barrel roller bearing. In the embodiment, eight slide blocks 5 are provided and are arranged on a guide shoe 6. The guide shoe 6 comprises four ends 7, to each of which, in this embodiment, a retaining structure 8 is attached by means of a bolt 9. As can be seen in FIG. 2, each retaining structure 8 comprises two slide blocks 5. These blocks slide on an underside 10 of the track 2 or on a lateral surface of the track.

Figure 3:
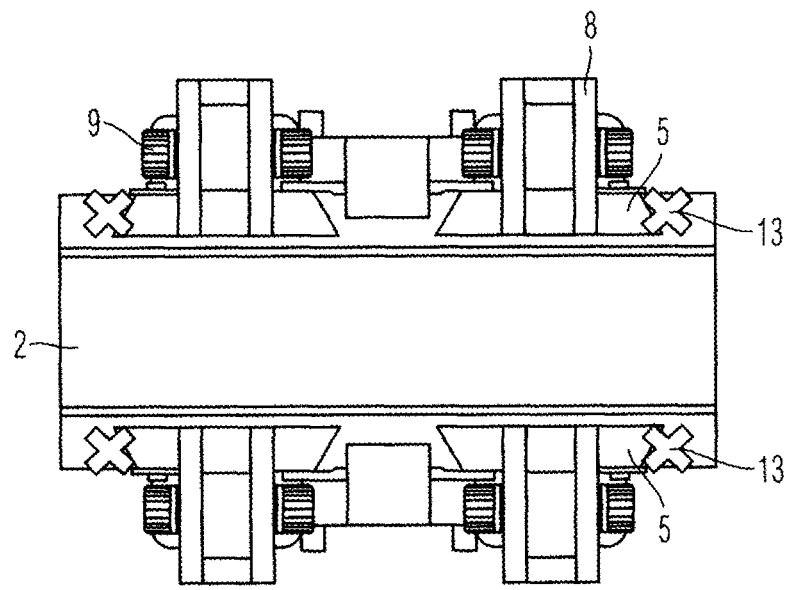
FIG. 3 is a bottom view of the carriage.
Figure 4:
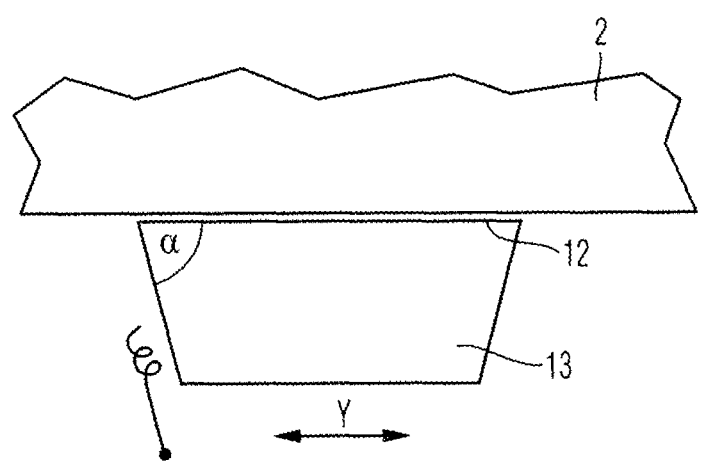
FIG. 4 is a sectional view of a detail of the carriage.

In the bottom view in FIG. 3, it can be seen how the carriage 1 is fixedly mounted against lateral movements by two pairs of slide blocks 5. FIG. 3 also indicates a preferred shape for the slide blocks 5, as is shown in an enlarged view in the bottom view in FIG. 4. By means of a trapezoidal design, in which the angle α on the side 12 facing the track 2 is acute, dirt is pushed away from the track 2 during operation. Therefore, the track 2 is automatically cleaned by means of the movement of the carriage 1 alone (indicated by the double arrow Y in FIG. 4).

Figure 5:
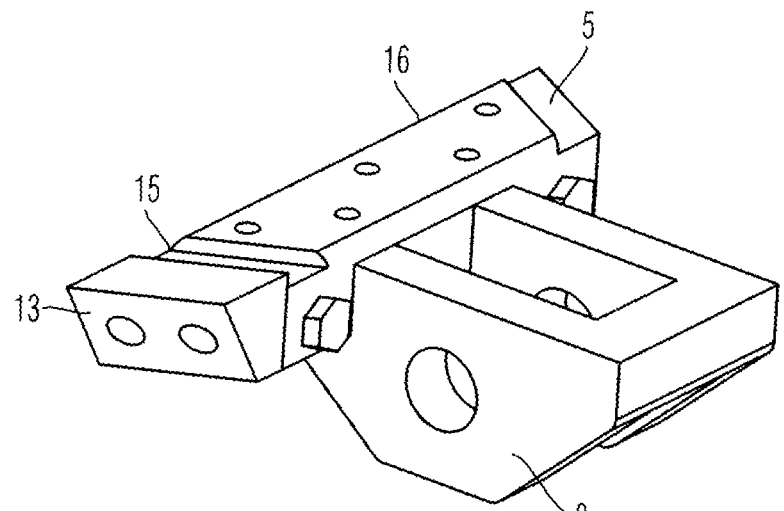
FIG. 5 is a perspective view of a retaining structure having a slide block.
Figure 6:
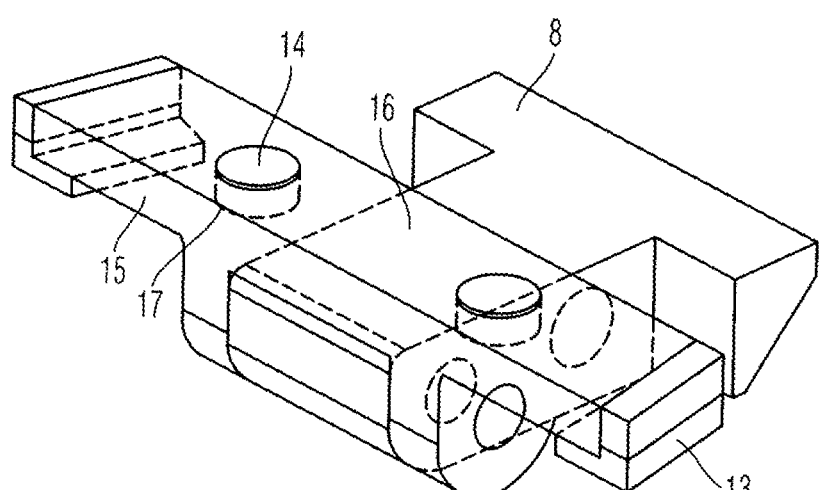
FIG. 6 is a perspective view of a retaining structure having a slide block according to a further embodiment.

The cleaning action is optionally reinforced by additional dirt guards 13, which are indicated schematically in FIG. 3 by crosses and shown in detail in FIG. 5. These can also be trapezoidal in order to bring about the cleaning action already described for the slide blocks 5. In this example, the dirt guards are brushes but can also be rubber elements or the like.

In a variant of the embodiment, a graphite pin 14 covered with 0.2 mm of sintered metal is inserted into the sintered metal of the slide blocks. Following 0.2 mm of wear, graphite is exposed and turns the track 2 black during operation. As a result, the 0.2 mm of wear can be easily detected. However, any other wear limit can also be set by selecting an accordingly thicker sintered metal covering. Besides the colouring, the graphite pin 14 results in improved emergency running properties.

The improved emergency running properties are particularly advantageous when an engineering material which has poorer sliding properties and acts substantially as the support body 15 for a sliding layer 16 on a contact surface 17 facing the track 2 is provided below the layer of sintered metal (which is 0.2 mm thick in this case). As a result, the material costs for the slide blocks and thus the plain bearing as a whole can be reduced.

The embodiment relates to a high-lift system for an aircraft, comprising a high-lift flap which is arranged on the wing of the aircraft and is mounted on a carriage coupled to the wing, the carriage being displaceably mounted on a track by means of a high-lift bearing. According to some embodiments, the high-lift bearing comprises a plain bearing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A high lift system for an aircraft, comprising:
   a wing;
   a carriage coupled to the wing;
   a high lift flap arranged on the wing and mounted to the carriage;
   a track on which the carriage is displaceably mounted; and
   a high lift bearing for mounting the track;
   wherein the high lift bearing comprises a plurality of slide blocks in sliding contact with surfaces of the track;
   wherein the slide blocks are trapezoidal, an angle on a side facing the track being an acute angle;
   wherein the track comprises opposing flanges comprising a first flange and a second flange;
   wherein the carriage comprises:
      a joint, coupled to the high lift flap, and having a point of rotation;
      a guide shoe overlying and flanking the flanges, and the guide shoe comprising four ends extending away from the joint; and
      retaining structures arranged at opposite sides of the track, each retaining structure coupled to a respective one of the four ends of the guide shoe, and each retaining structure comprising two slide blocks arranged to be in sliding contact with surfaces of the track to accommodate movement of the carriage along the track;

wherein the two slide blocks of each retaining structure include a first slide block located to slide on an underside of a respective one of the flanges, and a second slide block located to slide on a lateral surface of the respective one of the flanges.

2. A high lift system according to claim 1, wherein the slide blocks contain a material having a low coefficient of friction.

3. A high lift system according to claim 2, wherein the slide block comprises a support body having a material as a sliding layer on a contact surface facing the track.

4. A high lift system according to claim 3, wherein the material is applied as a coat, a layer, a coating or layer.

5. A high lift system according to claim 4, wherein the material is selected from a group consisting of Teflon, fiber-reinforced Teflon, graphite, lead alloy, tin alloy, and sintered metal having lubricant imbedding in its pores.

6. A high-lift system for an aircraft, comprising:
a track arranged on a wing of the aircraft, the track having opposing flanges comprising a first flange and a second flange;
a high-lift flap arranged on the wing of the aircraft; and
a carriage coupled to the high-lift flap and displaceably mounted on the track, the carriage comprising:
  a joint, coupled to the high-lift flap, and having a point of rotation;
  a guide shoe overlying and flanking the flanges, and the guide shoe comprising four ends extending away from the joint; and
  retaining structures arranged at opposite sides of the track, each retaining structure coupled to a respective one of the four ends of the guide shoe, and each retaining structure comprising two slide blocks arranged to be in sliding contact with surfaces of the track to accommodate movement of the carriage along the track;
wherein each of the slide blocks is trapezoidal, with an angle on a side facing the track being an acute angle; and wherein the two slide blocks of each retaining structure include a first slide block located to slide on an underside of a respective one of the flanges, and a second slide block located to slide on a lateral surface of the respective one of the flanges.

7. The high-lift system according to claim 6, wherein the slide blocks contain an engineering material having a low coefficient of friction.

8. The high-lift system according to claim 7, wherein the slide blocks comprise a support body which is provided with the material as a sliding layer on a contact surface facing the track.

9. The high-lift system according to claim 7, wherein the material is applied to the contact surface as a coat, a layer, a coating or a liner.

10. The high-lift system according to claim 7, wherein the material having the low coefficient of friction is a material from the group consisting of Teflon, fibre-reinforced Teflon, graphite, lead alloy, tin alloy and sintered metal having lubricant embedded in the pores.

11. The high-lift system according to claim 7, wherein the slide blocks are made of the material having a low coefficient of friction.

12. The high-lift system according to claim 6, wherein the slide blocks comprise dirt guards which are arranged and formed such that dirt on the track is wiped off during operation.

13. The high-lift system according to claim 12, wherein each of the dirt guards contains a brush or a rubber element.

14. The high-lift system according to claim 12, wherein the dirt guard is trapezoidal, an angle on the side which faces the track being acute.

15. The high-lift system according to claim 6, wherein a slide block comprises an abrasive-wear detection system.

16. The high-lift system according to claim 15, wherein the abrasive-wear detection system comprises a graphite region which can be exposed once the slide block has been worn down by a predetermined thickness.

* * * * *